United States Patent [19]

Nakamura

[11] Patent Number: 5,141,695
[45] Date of Patent: Aug. 25, 1992

[54] INJECTION MOLDING METHOD FOR MULTI-LAYER BOTTOMED PARISONS

[75] Inventor: Yoshinori Nakamura, Sakakimachi, Japan

[73] Assignee: Nissei ASB Machine Co., Ltd., Japan

[21] Appl. No.: 96,223

[22] Filed: Sep. 8, 1987

Related U.S. Application Data

[63] Continuation of Ser. No. 759,666, Jul. 29, 1985, abandoned.

[30] Foreign Application Priority Data

Jul. 31, 1984 [JP] Japan .................. 59-160872

[51] Int. Cl.$^5$ ............................. B29C 45/16
[52] U.S. Cl. .................. 264/255; 264/328.8; 264/513
[58] Field of Search ......... 264/513, 245, 255, 45.1, 264/328.8; 425/130, 523

[56] References Cited

U.S. PATENT DOCUMENTS 4,174,413 11/1979 Yasuike et al. ................. 428/35
4,525,134 6/1985 McHenry et al. ............... 264/513

FOREIGN PATENT DOCUMENTS 0125787 11/1984 European Pat. Off. .
2078171 1/1982 United Kingdom .
2091629 8/1982 United Kingdom .

Primary Examiner—Hubert C. Lorin
Attorney, Agent, or Firm—Ostrolenk, Faber, Gerb & Soffen

[57] ABSTRACT

An injection molding method for a multi-layer bottomed parison comprising: using a triple nozzle concentrically comprising a first flowpassage in communication with a nozzle hole, a second flowpassage and a third flowpassage respectively opening to a distal end of the first flowpassage in the inside of the nozzle hole, forming an inner layer and an outer layer of a bottomed parison with a resin from the first flowpassage, and forming a bottomed parison having a five-layer or a four-layer in section comprising an intermediate layer and a center layer or two intermediate layers with resins from the second flowpassage and the third flowpassage.

2 Claims, 3 Drawing Sheets

INJECTION MOLDING METHOD FOR MULTI-LAYER BOTTOMED PARISONS

This is a continuation of application Ser. No. 759,666 filed on Jul. 29, 1985 now abandoned.

BACKGROUND OF THE INVENTION (1) Field of the Invention

This invention relates, in the case where a synthetic resin container whose wall has more than four layers is subjected to blow or orientation blow molding, to an injection molding method for a multi-layer bottomed parison subjected to injection molding in advance.

(2) Prior Art

In synthetic resin containers having a thin-wall thickness formed by blow or orientation blow molding, the construction of the wall portion thereof is more than two layers to compensate for defects of synthetic resins from which the container is formed, for example, such as a heat resistance, gas barrier property and the like.

For forming a multi-layer container, it is generally preferable to form a three-layer construction which interposes between resins, of which a container is formed, a resin as an intermediate layer. This three-layer container, that is, a container comprising an inner layer and an outer layer which both layers being formed of the same resin, and an intermediate layer formed of the other resin, can be molded from a three-layer bottomed parison which was subjected to injection molding by use of a nozzle of double construction.

However, even though the bottomed parison is in a molten state when being subjected to injection molding, the two different resins used therefor do not adhere to each other and are easily separated by an external pressure.

Therefore, in bottles filled with carbonated drinks or the like, the carbonated gases which permeate into the inner layer are impaired from permeation into the outer layer by the presence of an intermediate layer having gas barrier properties interposed between the inner and outer layers, and the carbonated gases are often stagnate between the inner and intermediate layers generating bubbles.

As a means for preventing the phenomenon as just described, an attempt has been made to form adhesive layers on both sides of the intermediate layer to make sections thereof five layers.

Molding of a five-layer bottomed parison by injection molding is disclosed in Japanese Patent Application Disclosure No. 56-501082. According to the technique disclosed in the aforesaid patent application, a three-layer molding is basically provided which comprises a means for independently starting a first polymer flow serving as an inner surface layer of a parison, a second polymer flow serving as an outer surface layer and a third polymer flow serving as a center layer. In the case of a five-layer molding, a quintuple nozzle is used in which a fourth polymer flow if introduced between the third and first polymer flows and a fifth polymer flow is introduced between the third and second polymer flows.

In the above-described conventional technique, the inner surface layer and outer surface layer of a parison are formed from two different polymer flows, the central first flow and outer second flow, and between these two polymer flows, the third, fourth and fifth polymer flows which constitute the other layers introduced.

Thus, a nozzle used therefor should be a multiple nozzle provided with polymer flows equal in number to that of layers of a bottomed parison as required.

Unlike an extrusion molding nozzle in which each flowpassage is open to outside, an injection molding nozzle has a construction wherein each flowpassage is merged at one nozzle hole irrespective of the number of flowpassages. Therefore, there is a limit in the number of flowpassages, and it has been extremely difficult to securely mold a five-layer bottomed parison from a single nozzle by providing, within the nozzle, flowpassages in the number corresponding to that of layers of bottomed parisons. Moreover, even if such a multiple nozzle should be obtained, it would require a specific molding technique to injection-mold a bottomed parison without losing layers even after hollow container having a five-layers in section, each layer having an even wall thickness, has been formed by blow or orientation blow molding.

SUMMARY OF THE INVENTION

The present inventor has found as a result of a repeated study that the above-described technical problems noted above can be solved by using a nozzle provided with the number of flowpassages in a range allowable as an injection molding nozzle.

Accordingly, it is a first object of the present invention to provide a new method which can injection-mold a multi-layers bottomed parison having a five or four-layer in section by using a triple nozzle.

It is a further object of the invention to provide an injection molding method for a multi-layer bottomed parison which can not only enhance the barrier property or a heat resistance or concurrently enhance both barrier property and heat resistance.

To achieve the aforesaid objects, the present invention is characterized by using a triple nozzle concentrically comprising a first flowpassage in communication with a nozzle hole, a second flowpassage and a third flowpassage respectively opening to a distal end of the first flowpassage in the inside of the nozzle hole, forming an inner layer and an outer layer of a bottom parison with a resin from the first flowpassage, and forming a bottomed parison having a five-layer or a four-layer in section comprising an intermediate layer and a center layer or two intermediate layers with resins from the second flowpassage and the third flowpassage.

A multi-layer bottomed parison that may be molded by the method according to the present invention is finally molded into a hollow container by blow or orientation blow molding. Accordingly, resins used therefor are all thermoplastic resins. As these thermoplastic resins, resins normally used for the molding of containers (for example, such as polyethyleneterephthalate, vinylchloride, polypropylene, polycarbonate, acrylonitrile, vinylidene chloride, polyamide, ethylene-vinyl alcohol polyethylene, polystyrene, polyacetal, etc.) are selected, according to uses of containers molded from bottomed parisons, properties of resins and the like, and combined for use.

In the molding method according to the present invention, a resin layer for forming a bottomed parison will be a five-layer or a four-layer according to the injection state of a melted resin supplied to the flowpassages of the triple nozzle.

Molding is carried out from the bottom side of a bottomed parison in a manner similar to the case where a normal bottomed parison is subjected to injection molding. Each molten resin from the triple nozzle passes through a sprue of a cavity, which is controlled in temperature, from a nozzle hole, and is introduced under pressure into the periphery of a core.

In the present invention, whatever the case may be, the injection of the molten resin of the first flowpassage (hereinafter referred to as "the first molten resin") is effected first. The quantity of the first molten resin to be filled into the cavity varies with the resin used therefor. A molten resin of the second flowpassage (hereinafter referred to as "the second molten resin") is injected into the first molten resin after a predetermined quantity of the first molten resin has been filled into the cavity, and a molten resin of the third flowpassage (hereinafter referred to as "the third molten resin") is injected into the second molten resin.

By the stepwise injection of the molten resins as described above, the first molten resin is divided into an inner layer and an outer layer of a bottomed parison by the second molten resin within the cavity, and divided into two inner and outer intermediate layers by the third molten resin to form a bottomed parison having a five-layer in section with the third molten resin serving as a center layer.

Where both the second and third molten resins are injected at about the same time and introduced under pressure into the first molten resin, the second molten resin is not divided by the third molten resin but forms an intermediate layer together with the third molten resin. As a result, a bottomed parison formed thereof has a four-layer in section.

In the aforesaid five-layer bottomed parison, the center layer can be made into a gas barrier layer or a heat resisting layer. In the case of the four-layer, two intermediate layers can be divided into a gas barrier layer and a heat resisting layer, and the properties of these layers are determined according to uses of containers molded from bottomed containers.

DETAILED DESCRIPTION OF THE INVENTION

Figure 1:
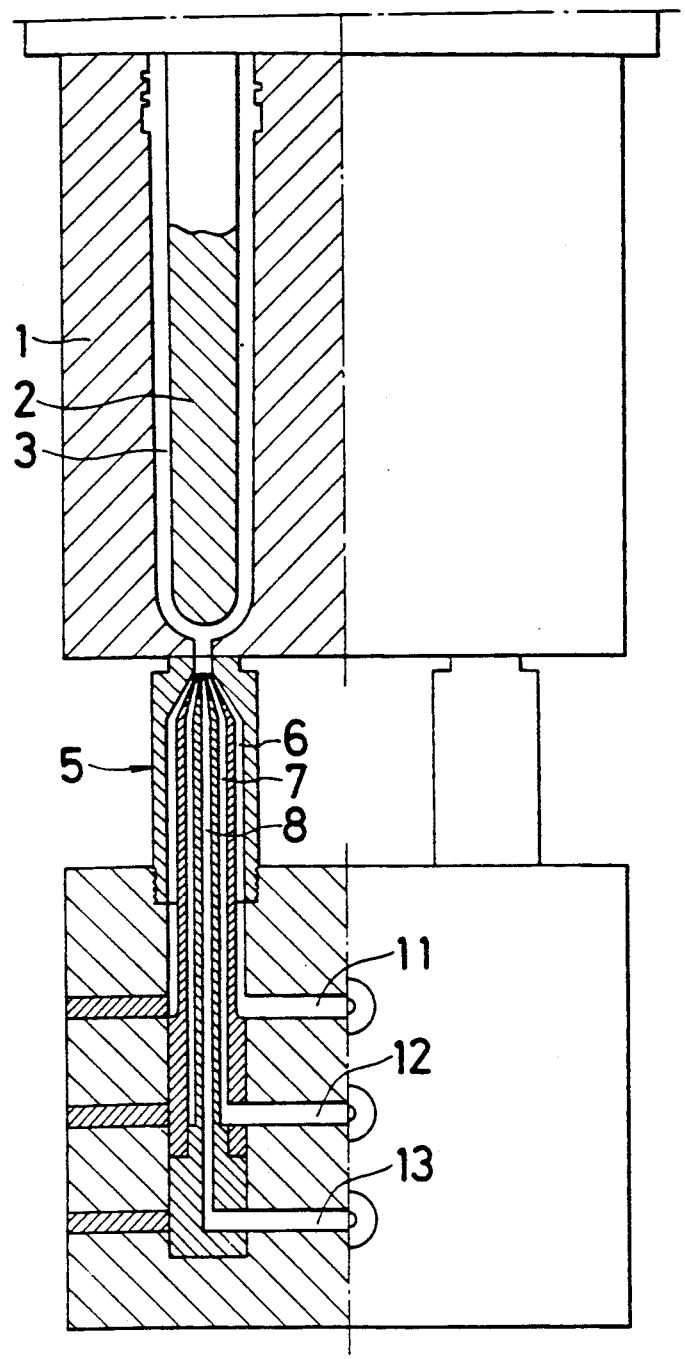
FIG. 1 is a schematic sectional view of a mold and a nozzle device used in the present invention.
Figure 6:
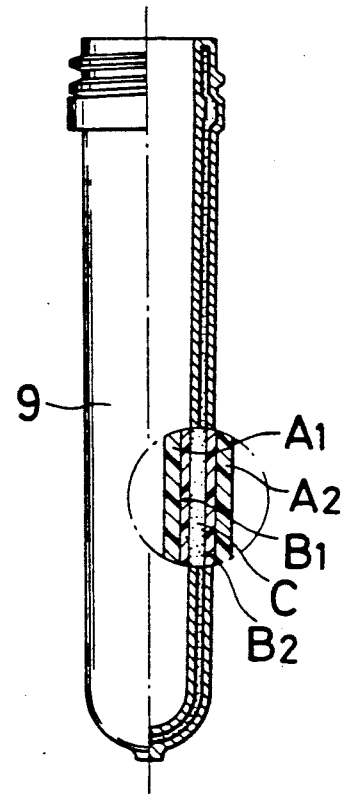
FIG. 6 is a longitudinal sectional front view, partly showing in an enlarged scale a part of a five-layer parison which has been injection-molded.

In the drawings, reference numeral 1 designates a mold for molding a parison having a bottom, and reference numeral 2 designates a core mold, a cavity 3 being formed between the mold 1 and the core mold 2. A sprue 4 is provided at a bottom portion of the cavity 3, and a nozzle device 5 is in touch with the sprue gate.

The nozzle device 5 is composed of a triple construction having a first flowpassage 6 in communication with a nozzle hole, a second flowpassage 7 and a third flowpassage 8, said second and third flowpassages 7 and 8 being respectively opened at a distal end of the first flowpassage 6 internally of the nozzle hole and being concentrically disposed. The flow passages 6, 7 and 8 are respectively connected to three injection apparatuses, not shown, directly or through hot runners 11, 12 and 13.

Next, injection molding of a bottomed parison having a five-layer in section will be described.

Figure 2:
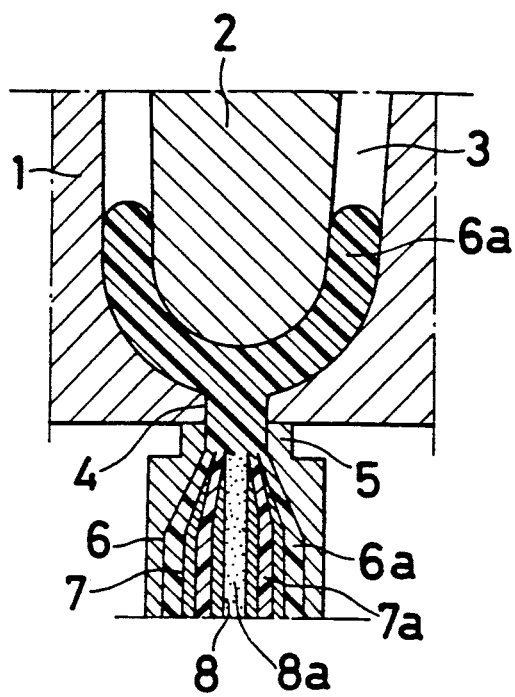
FIGS. 2 to 5 are respectively fragmentary sectional views of a distal end of a nozzle and a mold successively showing the steps of molding a five-layer.

First, a first molten resin 6a for forming a parison is injected from the first flowpassage 6 into the cavity 3 to be filled in a predetermined quantity thereof (FIG. 2).

Figure 3:
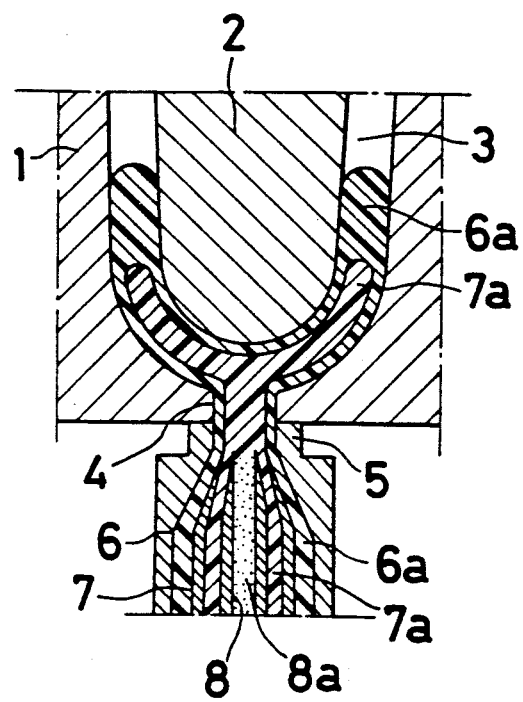

Then, a second molten resin 7a for forming an intermediate layer is injected from a second flowpassage 7 and introduced under pressure into the first molten resin 6a (FIG. 3).

Figure 4:
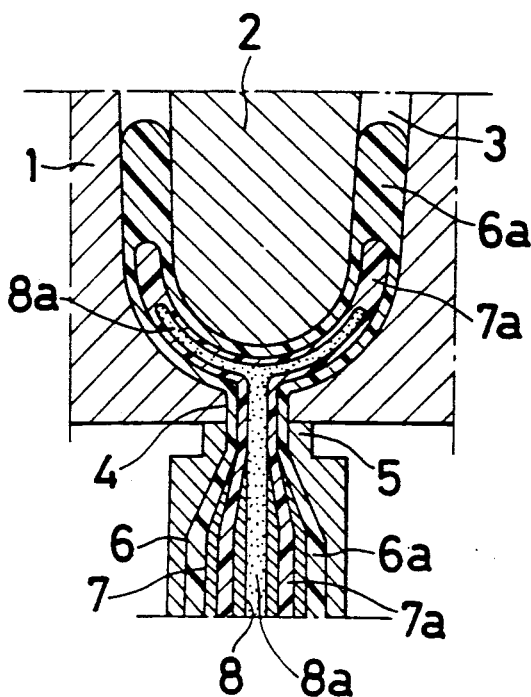

After the second molten resin 7a has been injected together with the first molten resin, a center layer is formed from the third flowpassage 8, and the third molten resin 8a is injected and introduced under pressure into the second molten resin 7a (FIG. 4).

When the third molten resin is introduced under pressure into the cavity while repeating the stepwise injection as described above, the first molten resin 6a is divided by the second molten resin 7a into two sides, the mold 1 side and the core mold 2 side, and the second molten resin 7a is also divided by the third molten resin into two sections so that the third molten resin 8a is positioned at a center.

Figure 5:
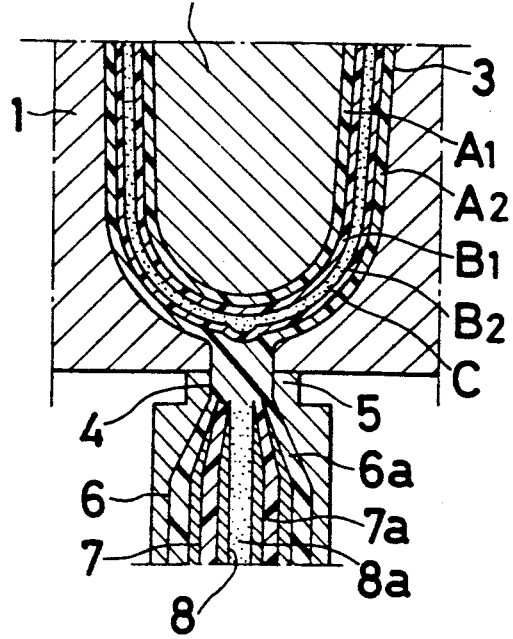

Stopping of injection the molten resins is made in such a manner that the second and third molten resins 7a and 8a are stopped first and finally the first molten resin 6a injection is stopped. As a result, the distal ends of the second and third molten resins 7a and 8a are internally sealed as shown in FIG. 5, and internally of an inner layer $A_1$ and an outer layer $A_2$ formed by the first molten resin 6a to form a five-layer bottomed parison 9 comprising two intermediate layers $B_1$ and $B_2$ formed by the second molten resin 7a and a center layer C by the third molten resin 8a sandwiched between the intermediate layers $B_1$ and $B_2$ (FIG. 5).

Figure 7:
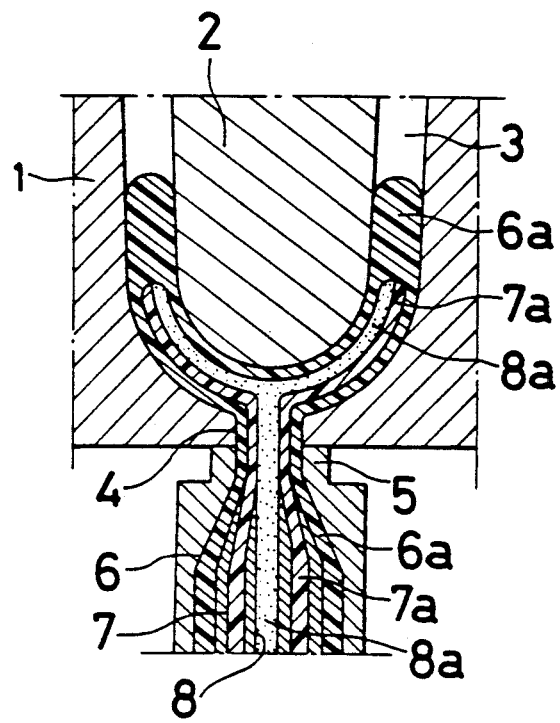
FIGS. 7 and 8 are respectively fragmentary sectional views of a distal end of a nozzle and a mold successively showing the steps of forming a four-layer product.

In the case where a bottomed parison having a four-layers in section is injection-molded, the injection of the first molten resin 6a is effected first in a manner similar to the previous description. Next, the aforesaid injection is stopped, and the second molten resin 7a and the third molten resin 8a are concurrently injected and introduced under pressure into the first molten resin 6a. Then, both the resins are injected along with the first molten resin 7a and 8a (FIG. 7).

These two molten resins 7a and 8a divide the first molten resin 6a into an injection mold 1 side and a core mold 2 side. The second molten resin 7a and the third molten resin 8a are filled along with the first molten resin 6a into the cavity 3 along the injection mold side and core mold 2 side, respectively.

After being filled, the injection of the second and third molten resins 7a and 8a is stopped, and the injection of the first molten resin 6a is finally stopped to confine the distal ends of the second and third molten resins 7a and 8a.

Figure 8:
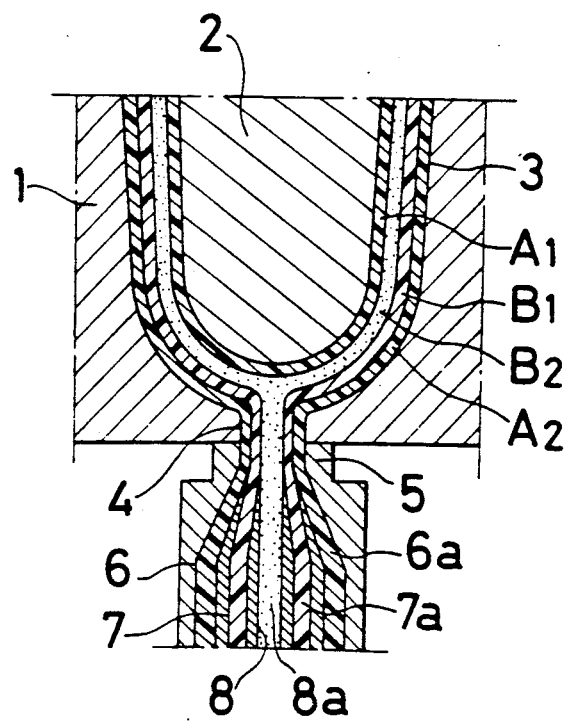
Figure 9:
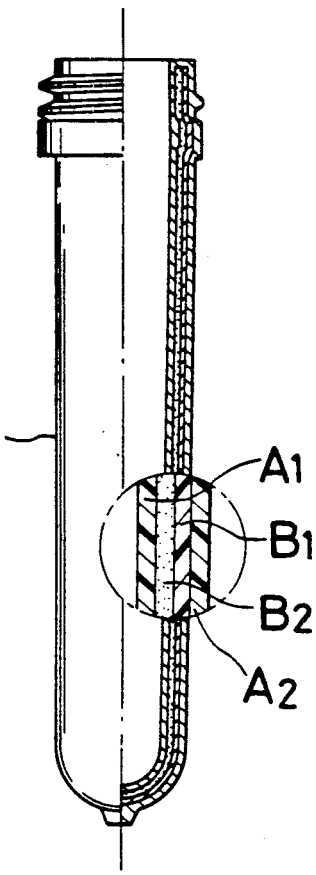
FIG. 9 is a longitudinal sectional front view, partly showing in an enlarge scale a part of a four-layer parison which has been injection-molded.

As the result, within the cavity is formed a four-layer bottomed parison 10 in which two intermediate layers $B_1$ and $B_2$ formed by the second molten resin 7a and third molten resin 8a are present in a superposed state between the inner layer $A_1$ and the outer layer $A_2$ formed by the first molten resin 6a (FIG. 8).

Where the aforesaid bottomed parisons 9 and 10 are used to form bottles for carbonated drinks, the first molten resin 6a may comprise polyethyleneterephthalate, the third molten resin 8a comprise resins having a gas barrier property such as ethylene vinyl alcohol, polyamide, etc., and the second molten resin 7a comprise a blend resin of polyethyleneterephtalate and ethylene vinyl alcohol or polyamide.

The proportion of the second and third molten resins 7a and 8a is about 5 to 10% that of a weight of a parison.

It is noted in the above-described embodiments that the injection conditions such as temperatures of the molten resins, injection timing, temperatures of molds and the like vary with resin materials to be used, and the wall-thickness distributions of the layers can also be adjusted by suitably selecting and controlling the injection conditions.

What is claimed is:

1. An injection molding method for a five layer cross section bottomed parison having outer and inner layers formed from one molten resin flow comprising, successively, providing a triple nozzle which comprises three concentric flowpassages opening at their respective distal ends and in fluid communication with a nozzle hole of said triple nozzle, injecting a predetermined quantity of a first molten resin from one flowpassage into a cavity to form the outer and inner layers of the parison; injecting a predetermined quantity of a second molten resin from a different flowpassage under pressure into the first molten resin in said cavity; injecting a molten resin different from the second molten resin under pressure into the second molten resin in said cavity; and allowing a flow of said first resin to continue after the flow of said second and third resins has been stopped.

2. An injection molding method for forming a walled parison having innermost and outermost layers formed from one resin and whose walls have four layers in cross section wherein an injection molding nozzle having three flowpassages therein is used, said method comprising providing a triple nozzle which concentrically comprises a first flowpassage in communication with a nozzle hole, a second flowpassage and a third flowpassage respectively opening to a distal end of the first flowpassage in the inside of the nozzle hole, causing a first resin which will form the innermost and outermost layers of the parison to flow from said injection molding nozzle into a cavity, thereafter causing a second and a third resin to simultaneously flow from said injection molding nozzle into said first resin in said cavity, and allowing a flow of said first resin to continue after the flow of said second and third resins has been stopped.

* * * * *